United States Patent [19]
McDonald

[11] 3,865,212
[45] Feb. 11, 1975

[54] SURVEILLANCE AIRCRAFT MUFFLER

[76] Inventor: Hugh C. McDonald, 8200 Redlands, No. 308, Playa Del Rey, Calif. 90291

[22] Filed: Dec. 14, 1973

[21] Appl. No.: 424,674

[52] U.S. Cl.............................. 181/43, 181/33 H
[51] Int. Cl.............................................. F01n 1/14
[58] Field of Search......... 181/33 E, 33 HC, 33 HD, 181/35, 41, 43, 45; 244/53, 54, 57–60

[56] References Cited
UNITED STATES PATENTS

| | | | |
|---|---|---|---|
| 1,370,197 | 3/1921 | Bolotoff | 181/43 |
| 1,709,332 | 4/1929 | Webb | 181/63 |
| 1,874,406 | 8/1932 | Wright | 244/53 R |
| 2,308,059 | 1/1943 | Decker | 181/43 |
| 2,390,161 | 12/1945 | Mercier | 181/33 HC |
| 2,506,810 | 5/1950 | Ospina-Racines | 181/43 |
| 2,618,355 | 11/1952 | Hedrick | 181/68 |
| 3,096,617 | 7/1963 | Bryant | 181/33 HC |
| 3,543,876 | 12/1970 | Karlson | 181/43 |
| 3,655,007 | 4/1972 | Hilbig | 181/33 E |

FOREIGN PATENTS OR APPLICATIONS

| | | | |
|---|---|---|---|
| 674,355 | 8/1928 | France | 181/43 |

Primary Examiner—Stephen J. Tomsky
Assistant Examiner—Vit W. Miska
Attorney, Agent, or Firm— Pastoriza & Kelly

[57] ABSTRACT

A muffler takes the form of a horizontal tubular member having a partition in one end which defines with an upper wall of the member an exhaust passage and with the lower wall of the member an air scoop. The arrangement is such that the exhaust passage includes a smoothly upwardly curved portion for connection directly to the downwardly extending exhaust pipe of an aircraft engine. The central portion of the tubular member is reduced in diameter to define at the end of the partition a venturi section, the other end of the tubular member flaring outwardly to terminate in an enlarged outlet opening. Exhaust gases are thus sucked into the muffler by action of the air scoop and venturi section, noise and gases from the exhaust pipe being directed horizontally rearwardly out the end of the muffler so that any sound in a downward direction is minimal.

3 Claims, 4 Drawing Figures

PATENTED FEB 11 1975 3,865,212

3,865,212

SURVEILLANCE AIRCRAFT MUFFLER

This invention relates generally to mufflers and more particularly to an improved muffler particularly designed for use with surveillance aircraft.

BACKGROUND OF THE INVENTION

In copending patent application Ser. No. 330,481, filed Feb. 8, 1973, wherein I am a co-inventor with Earl R. Brown, there is shown and described an aircraft muffler particularly useful in preventing noise from being directed downwardly from a surveillance aircraft engine. As pointed out in this copending application, it has been the practice for several years for municipal police departments to use helicopters for surveillance work. More recently, however, some of these helicopters have been replaced by a high wing monoplane capable of performing most of the tasks of the helicopter insofar as surveillance is concerned. However, without some means of evading noise from the aircraft engine which is normally directed downwardly from a downwardly extending exhaust pipe, there remains the problem of suspects on the ground being warned of the presence of the surveillance aircraft.

While the particular muffler described in the above-referred to, copending application has met with some success and is presently provided on a number of surveillance aircraft, there is still room for improvement in sound abatement, particularly sound directed towards the ground.

BRIEF DESCRIPTION OF THE PRESENT INVENTION

With the above background in mind, I have now independently invented an improved muffler structure substantially different in design from the muffler described in the above-referred to, copending application and which operates on somewhat different principles all to the end that when used on surveillance aircraft, any noise or sound directed earthward while the aircraft is in horizontal flight is minimal.

More particularly, my improved muffler comprises a generally horizontally extending tubular member, one end having a horizontal partition defining on its upper side with the upper wall of the tubular member an exhaust passage which curves smoothly upward approximately 90° to terminate in a clamping collar means for affixing the exhaust passage to the downwardly directed end of the aircraft engine exhaust pipe. The lower side of this partition defines with the lower wall of the tubular member an horizontal air scoop passage flaring outwardly to terminate in an air scoop opening below the level of the collar. The central passage of the tubular member at the end of the partition is of reduced diameter, the central passage then increasing in diameter in the direction towards its outlet end. A venturi section is thus defined in the tubular member to such noise and exhaust gases into the muffler and direct the noise and exhaust rearwardly out the outlet opening in a generally horizontal direction; that is, away from the ground.

Further features of my improvements include means for adjusting the venturi effect and lip means at the outlet opening for directing the outlet gas and noise generally upwardly relative to the horizontal.

BRIEF DESCRIPTION OF THE DRAWINGS

A better understanding of my invention will be had by now referring to the accompanying drawings in which.

DETAILED DESCRIPTION OF THE PREFERRED EMBODIMENT

Figure 1:
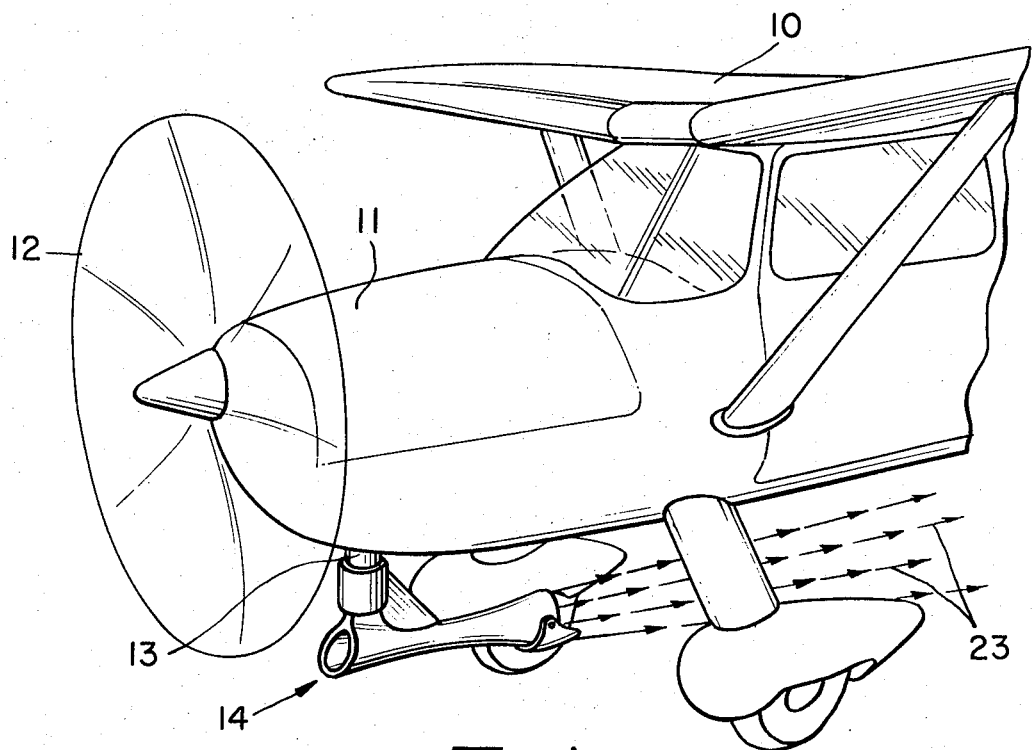
FIG. 1 is a fragmentary perspective view of the front portion of a surveillance aircraft with the improved muffler of this invention in place.

Referring first to FIG. 1 there is shown a surveillance aircraft 10 including a front engine 11 and propeller 12. The exhaust pipe for the engine normally extends downwardly as indicated at 13 so that in the absence of a suitable muffler, the sound of the engine is directed towards the earth.

To avoid the problem of such downwardly-directed noise, which can alert suspects on the ground when the plane is in flight, my improved muffler, indicated generally by the numeral 14 in FIG. 1 is secured directly to the outlet downwardly extending portion of the exhaust pipe 13.

Figure 2:
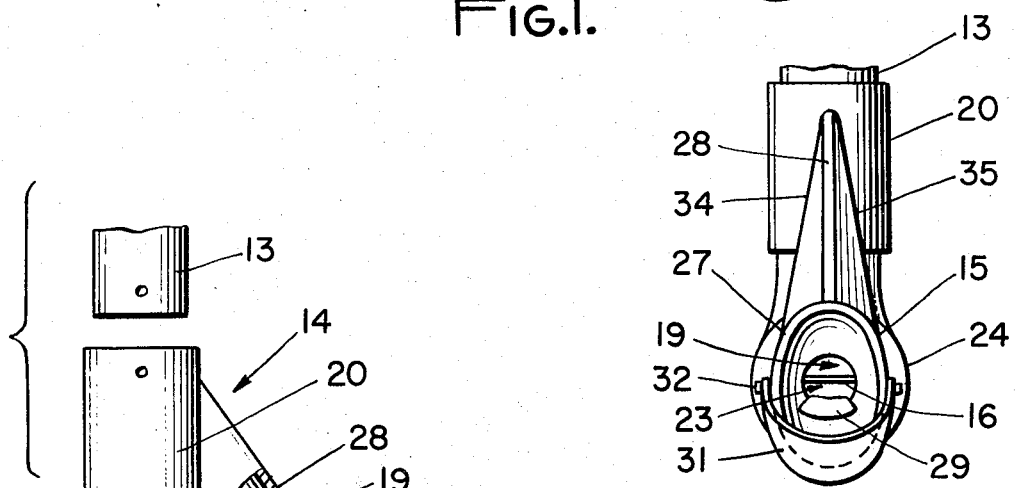
FIG. 2 is an enlarged side elevational view partly in cross-section of the muffler shown slightly separated from the aircraft engine exhaust pipe.

Referring now to FIG. 2, the muffler essentially comprises an horizontal elongated tubular member 15 having a generally horizontal partition 16 formed in one end. The upper side of this partition indicated at 17 defines with an upper inner wall portion 18 of the member 15 an exhaust passage 19 which curves smoothly upwardly approximately 90° to terminate in a clamping collar means 20. This clamping collar means is arranged to be secured directly to the outlet end of the downwardly extending exhaust pipe 13 of the aircraft engine of FIG. 1.

The lower side of the partition 17 indicated at 21 in turn, defines with a lower interior wall portion 22 of the member 15 an horizontal air scoop passage 23 which flares outwardly to terminate in an air scoop opening 24 below the level of the collar 20.

The central passage of the tubular member 15 in the area close to the inner end of the partition 16 is of reduced diameter as indicated at 25, this diameter then increasing gradually in a direction towards the other end of the tubular member as indicated at 26 to terminate in a flared outlet opening 27.

There is thus defined a venturi section in the central passage at 25, the speed of air entering the air scoop opening 24 greatly increasing in this venturi section to thereby result in a reduced pressure.

In order to increase the structural strength of the muffler, there is provided a triangular web 28 which, as will become clearer as the description proceeds, has edge portions in continuous securement with the collar 20 and outer wall portion of the exhaust passage 19.

Still referring to FIG. 2, a feature of this invention resides in the provision of an expandable means 29 covering an inner wall portion of the venturi section of the tubular member 15. This expandable means 29 may take the form of a resilient material which can be expanded away from the wall portion to in effect decrease the cross-sectional flow area at the venturi section. For example, there is indicated a means for adjusting the degree of expansion in the form of a small screw 30 which can be threaded inwardly to urge the expandable means radially inwardly and thus decrease the venturi section area. This arrangement permits the venturi effect to be adjusted.

Another feature of the muffler of this invention resides in the provision of a curved plate 31 defining a lip at the outlet opening 27 of the tubular member. As shown, this lip may be pivoted as at 32 for swinging movement as indicated by the double-headed arrow 33.

Figure 3:
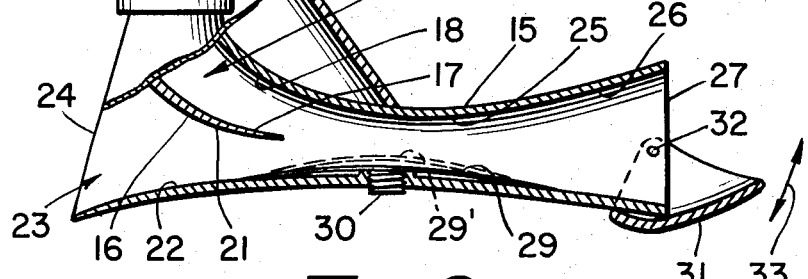
FIG. 3 is an end view of the muffler of FIG. 2 looking at the outlet exhaust opening; and, FIG. 4 is a fragmentary elevational view of the outlet end of the muffler of FIG. 2.

Referring now to the end view of FIG. 3, it will be noted that in the particular embodiment illustrated, the tubular member is flattened in a vertical plane towards its outlet end so that the outlet end opening 27 is oval in shape. It will also be seen the manner in which the triangular web structure 28 is continuously secured along edge portions to the collar and tubular member. Thus, there is indicated at 34 and 35 this continuous securement.

Figure 4:
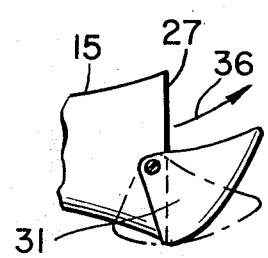

The other components of the muffler, such as the partition 16, exhaust passage 19, and air scoop passage 23 as well as the expandable means 29 are all shown in FIG. 3 and designated by the same numerals. Referring now to FIG. 4, there is shown in full line the adjustable curved plate or lip 31 wherein it will be noted that when adjusted to the solid line position shown, exhaust air and gas is directed upwardly as indicated by the arrow 36 at a desired angle to the horizontal.

OPERATION

In operation, the muffler is secured directly to the downwardly extending exhaust pipe 13 by means of the clamping collar 20 as described heretofore. The sole support for the muffler to the aircraft is thus its securement at one end to the exhaust pipe of the engine. As a consequence, vibrations of the muffler and exhaust pipe are not communicated to the aircraft through any other supporting structures.

When the aircraft is in level flight, the air flow will pass directly into the air scoop 23 described in FIG. 2, this flow being enhanced by the action of the propeller. Because of the venturi section, the air flow will greatly speed up at the central portion of the tubular member so that a reduced pressure is generated which literally "sucks" the exhaust gases and noise in the exhaust passage 19 from the exhaust pipe 13 and directs the noise and gases out the outlet opening 27. Noise is thus directed horizontally rearwardly rather than downwardly so that any noise towards the earth is minimal.

In the event the structure of the aircraft is such that it is desired to direct the outlet gases in a direction different from the horizontal, the adjustable lip 31 may be angulated to direct the gases upwardly relative to the horizontal all as described in FIG. 4.

From the foregoing description, it will be seen that I have provided an improved muffler, particularly useful on surveillance aircraft.

What is claimed is:

1. A surveillance aircraft muffler wherein the exhaust pipe for the aircraft engine extends downwardly behind the propeller when the aircraft is in level flight, said muffler comprising: an elongated tubular member extending horizontally,
   a. one end of the tubular member having an horizontal partition defining on its upper side with the upper wall of the tubular member an exhaust passage which curves smoothly upwardly approximately 90° to terminate in a clamping collar means for affixing said exhaust passage to the downwardly directed end of said exhaust pipe,
   b. the lower side of said partition defining with the lower wall of the tubular member an horizontal air scoop passage flaring outwardly to terminate in an air scoop opening below the level of said collar,
   c. the central passage of said tubular member at the end of the partition being of reduced diameter, the central passage then increasing in diameter in a direction towards its other end to terminate in a flared outlet opening, the reduced diameter portion of said central passage including:
   d. expandable means covering an inner wall portion thereof,
   e. means for expanding said expandable means away from the wall portion to vary the effective cross sectional flow area for air and exhaust gases passing through the reduced diameter portion, whereby a venturi section is defined in said tubular member which is adjustable by said expandable means to provide a decreased air pressure at the end of the partition as a consequence of air flow into said air scoop opening so that exhaust gases and noise in said exhaust passage are sucked out of the engine exhaust pipe and directed rearwardly out said outlet opening, and,
   f. a curved plate mounted on the lower portion of said outlet opening to define a lip which may be angularly adjusted to direct the outlet flow of gases upwardly at a desired angle with respect to the horizontal so that substantially no sound is directed downwardly towards the earth when said aircraft is in level flight.

2. A muffler according to claim 1, including a triangular shaped web having edge portions secured in a continuous manner to said clamping collar and upper wall portion of said one end of said tubular member to strengthen said muffler, the sole support for said muffler to said aircraft being its securement at said one end to the exhaust pipe of said engine whereby vibrations of the muffler and exhaust pipe are not communicated to said aircraft through other support structures.

3. A muffler according to claim 1, in which said tubular member is gradually flattened in a vertical plane towards its outlet end so that said outlet opening is oval-shaped.

* * * * *